US010770235B2

(12) United States Patent
Sim et al.

(10) Patent No.: US 10,770,235 B2
(45) Date of Patent: Sep. 8, 2020

(54) MULTILAYER CAPACITOR

(71) Applicant: SAMSUNG ELECTRO-MECHANICS CO. LTD., Suwon-si, Gyeonggi-do (KR)

(72) Inventors: Won Chul Sim, Suwon-si (KR); Young Ghyu Ahn, Suwon-si (KR); Heung Kil Park, Suwon-si (KR); Soo Hwan Son, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 36 days.

(21) Appl. No.: 16/166,758

(22) Filed: Oct. 22, 2018

(65) Prior Publication Data

US 2019/0279824 A1 Sep. 12, 2019

(30) Foreign Application Priority Data

Mar. 9, 2018 (KR) .................. 10-2018-0028253
Jun. 4, 2018 (KR) .................. 10-2018-0064146

(51) Int. Cl.
*H01G 4/35* (2006.01)
*H01G 4/01* (2006.01)
*H01G 4/12* (2006.01)
*H01G 4/232* (2006.01)
*H01G 4/30* (2006.01)

(52) U.S. Cl.
CPC .............. *H01G 4/35* (2013.01); *H01G 4/01* (2013.01); *H01G 4/1227* (2013.01); *H01G 4/232* (2013.01); *H01G 4/30* (2013.01)

(58) Field of Classification Search
CPC .......... H01G 4/35; H01G 4/01; H01G 4/1227; H01G 4/232; H01G 4/30
See application file for complete search history.

(56) References Cited

U.S. PATENT DOCUMENTS

| 7,307,829 B1 * | 12/2007 | Devoe | H01G 2/065 |
| | | | 361/303 |
| 7,436,650 B2 * | 10/2008 | Oguni | H01G 4/012 |
| | | | 361/306.1 |
| 8,526,163 B2 * | 9/2013 | Lee | H01C 7/10 |
| | | | 361/306.1 |

(Continued)

FOREIGN PATENT DOCUMENTS

| JP | 2012-204572 A | 10/2012 |
| KR | 10-2015-0019643 A | 2/2015 |
| KR | 10-2015-0033302 A | 4/2015 |

*Primary Examiner* — Dion Ferguson
(74) *Attorney, Agent, or Firm* — Morgan, Lewis & Bockius LLP (57) ABSTRACT

A multilayer capacitor in which acoustic noise is reduced has an area of overlap between internal electrodes in an active region of a lower portion of a capacitor body that is smaller than an area of overlap between internal electrodes in an active region of an upper portion of the capacitor body. The multilayer capacitor can be bonded to a board by relatively small solders such that the lower portion is adjacent the board. Deviations between areas of overlap of adjacent internal electrodes in the upper and lower portions of the active region are minimized to reduce piezoelectric deformation of the capacitor body.

19 Claims, 8 Drawing Sheets

(56) References Cited

U.S. PATENT DOCUMENTS

| | | | | |
|---|---|---|---|---|
| 2004/0042156 A1* | 3/2004 | Devoe | ............... | H01G 4/228 |
| | | | | 361/321.2 |
| 2013/0321981 A1* | 12/2013 | Ahn | ............... | H01G 4/30 |
| | | | | 361/321.2 |
| 2014/0016242 A1 | 1/2014 | Hattori et al. | | |
| 2014/0138136 A1* | 5/2014 | Ahn | ............... | H01G 2/065 |
| | | | | 174/260 |
| 2014/0290998 A1* | 10/2014 | Ahn | ............... | H01G 4/30 |
| | | | | 174/260 |
| 2015/0016015 A1* | 1/2015 | Lee | ............... | H01G 4/30 |
| | | | | 361/301.4 |
| 2015/0279569 A1* | 10/2015 | Ahn | ............... | H01G 2/065 |
| | | | | 174/260 |
| 2016/0104577 A1* | 4/2016 | Cho | ............... | H01G 4/30 |
| | | | | 361/301.4 |
| 2017/0213647 A1* | 7/2017 | Ahn | ............... | H05K 3/3442 |
| 2018/0174757 A1* | 6/2018 | Kim | ............... | H01G 4/232 |

* cited by examiner

MULTILAYER CAPACITOR

CROSS-REFERENCE TO RELATED APPLICATION(S)

This application claims benefit of priority to Korean Patent Applications No. 10-2018-0028253 filed on Mar. 9, 2018 and No. 10-2018-0064146 filed on Jun. 4, 2018 in the Korean Intellectual Property Office, the disclosures of which are incorporated herein by reference in their entireties.

BACKGROUND

1. Field

The present disclosure relates to a multilayer capacitor.

2. Description of Related Art

Recently, efforts have been made in the development of electronic devices to reduce noise produced by electronic components, such that acoustic noise generated by multilayer capacitors (MLCCs).

Dielectric materials used in multilayer capacitors have piezoelectric characteristics, and may thus be deformed in synchronization with an applied voltage.

When a period of the applied voltage is within an audio frequency band, the displacement of the dielectric material by the piezoelectric effect gives rise to vibrations that are transferred to a board through solders, and the vibrations of the board are heard as sound. This is known as acoustic noise and is considered to be problematic in the electronic device.

When a device is operated in a silent environment, a user may detect acoustic noise as a strange sound and may believe that a fault has occurred in the device. Additionally, in a device having an audio circuit, the acoustic noise may overlap audio output such that device audio/sound quality may be deteriorated.

In addition, when piezoelectric vibrations of the multilayer capacitor are generated in a high frequency region of 20 kHz or more, the vibrations may give rise to malfunctions of various sensors used in the information technology (IT) and industry/electrical component fields separately from any acoustic noise recognized by the ears of a person.

SUMMARY

An aspect of the present disclosure may provide an electronic component having reduced acoustic noise in an audio frequency region less than 20 kHz and high frequency vibrations in a high frequency region of 20 kHz or more.

According to an aspect of the present disclosure, a multilayer capacitor may include a capacitor body having an active region including a plurality of dielectric layers and a plurality of internal electrodes stacked with each of the dielectric layers interposed therebetween. The capacitor body has first and second surfaces opposing each other, and third and fourth surfaces connected to the first and second surfaces and opposing each other. One end of each internal electrode of the plurality of stacked internal electrodes is exposed through an alternating one of the third and fourth surfaces. First and second external electrodes are disposed, respectively, on the third and fourth surfaces of the capacitor body, and connected, respectively, to the internal electrodes exposed through the third and fourth surfaces of the capacitor body. The active region includes a first active region adjacent to the second surface of the capacitor body and a second active region adjacent to the first surface of the capacitor body, the first surface of the capacitor body being a mounting surface of the capacitor body. An area of overlap between adjacent internal electrodes in the second active region is smaller than an area of overlap between adjacent internal electrodes in the first active region, a deviation between areas of overlap between the adjacent internal electrodes in the first active region is 5% or less, and a deviation between areas of overlap between the adjacent internal electrodes in the second active region is 5% or less.

According to another aspect of the present disclosure, a multilayer capacitor may include a capacitor body having an active region including a plurality of dielectric layers and a plurality of internal electrodes stacked with each of the dielectric layers interposed therebetween. The capacitor body has first and second surfaces opposing each other, and third and fourth surfaces connected to the first and second surfaces and opposing each other. One end of each internal electrode of the plurality of stacked internal electrodes is exposed through an alternating one of the third and fourth surfaces. First and second external electrodes are disposed, respectively, on the third and fourth surfaces of the capacitor body, and connected, respectively, to the internal electrodes exposed through the third and fourth surfaces of the capacitor body. The active region includes a first active region adjacent to the second surface of the capacitor body and a second active region adjacent to the first surface of the capacitor body, the first surface of the capacitor body being a mounting surface of the capacitor body. The internal electrodes are provided in the second active region with a lower density than the internal electrodes are provided in the first active region, a deviation between the lengths of the internal electrodes in the first active region is 5% or less, and a deviation between the lengths of the internal electrodes in the second active region is 5% or less.

Lengths of the internal electrodes in the second active region may be shorter than lengths of the internal electrodes in the first active region.

A thickness of the first active region in a stacking direction of the internal electrodes may be 50% or more of a thickness of the entire active region.

The area of overlap between the internal electrodes in the second active region may be 25% or more of the area of overlap between the internal electrodes in the first active region.

The area of overlap between the adjacent internal electrodes in the second active region may be 85% or less of the area of overlap between the adjacent internal electrodes in the first active region.

The multilayer capacitor may further include dummy electrodes disposed in the second active region so as to be spaced apart from the internal electrodes and be spaced apart from the first and second external electrodes.

According to a further aspect of the present disclosure, a multilayer capacitor may include a capacitor body including pluralities of first and second internal electrodes alternately stacked with dielectric layers therebetween, and pluralities of third and fourth internal electrodes alternately stacked with dielectric layers therebetween. First and second external electrodes are disposed on first and second side surfaces of the capacitor body opposite each other in a length direction. One end of each first and third internal electrode is exposed to the first side surface having the first external electrode, and one end of each second and fourth internal electrode is exposed to the second side surface having the second external electrode. An area of overlap between adjacent third and fourth internal electrodes is 85% or less of the area of overlap between adjacent first and second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Hereinafter, directions of a capacitor body 110 will be defined in order to clearly describe exemplary embodiments in the present disclosure. The X, Y and Z directions shown in the drawings refer to a length direction, a width direction, and a thickness direction of the capacitor body 110, respectively. In addition, in the present exemplary embodiment, the Z direction refers to a stacking direction in which dielectric layers are stacked in a capacitor body.

Referring to FIGS. 1, 2, 3B, 4B, 5B, and 5F, a multilayer capacitor according to an exemplary embodiment in the present disclosure may include a capacitor body 110 and first and second external electrodes 131 and 132 formed on opposite end surfaces of the capacitor body 110.

Figure 1:
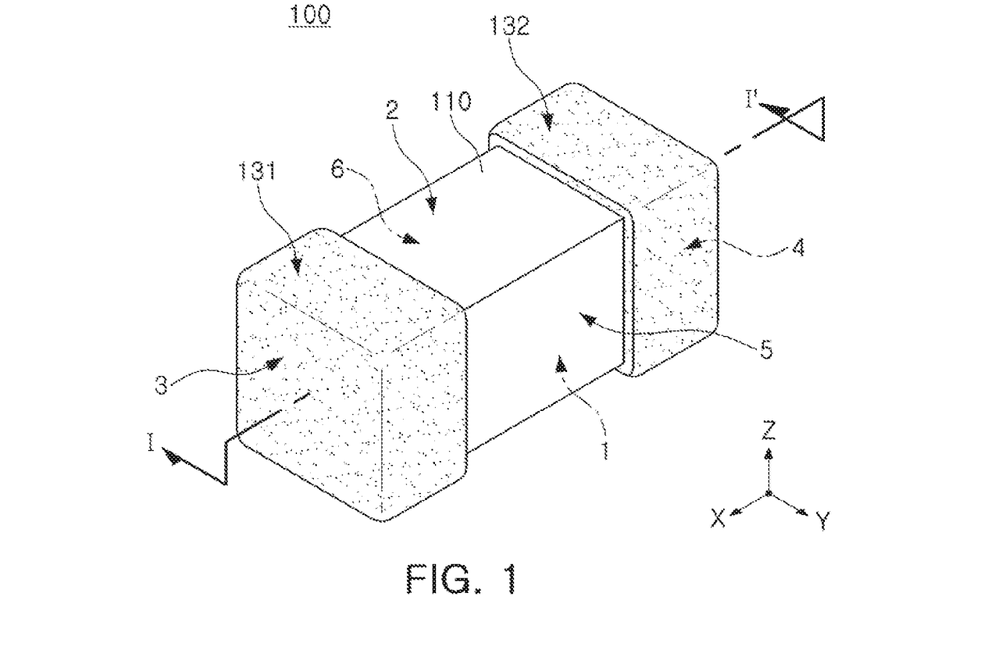
FIG. 1 is a schematic perspective view illustrating a multilayer capacitor according to an exemplary embodiment.
Figure 2:
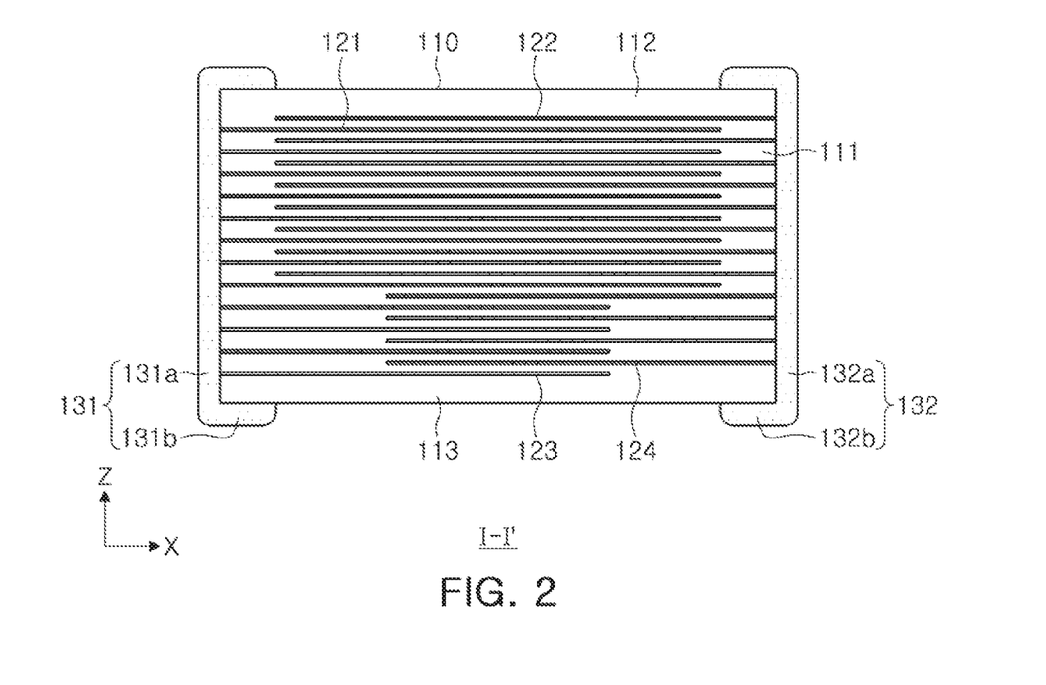
FIG. 2 is a cross-sectional view taken along line I-I' of FIG. 1.

The capacitor body 110 may be formed by stacking and then sintering a plurality of dielectric layers 111 in the Z direction, and may include the plurality of dielectric layers 111 and a plurality of internal electrodes alternately disposed in the Z direction with each of the dielectric layers 111 interposed therebetween.

In this case, the dielectric layers 111 and the internal electrodes may be stacked in parallel with a first surface of the capacitor body 110 that corresponds to a mounting surface to be described below.

In addition, the capacitor body 110 may include an active region including the plurality of internal electrodes stacked in the Z direction, and cover regions 112 and 113 disposed, respectively, on upper and lower surfaces of the active region.

The cover regions 112 and 113 may refer to regions in which the internal electrodes are not disposed.

In this case, the respective adjacent dielectric layers 111 of the capacitor body 110 may be integrated with each other so that boundaries therebetween are not readily apparent.

The capacitor body 110 may have a substantially hexahedral shape. However, a shape of the capacitor body 110 is not limited thereto.

In the present exemplary embodiment, for convenience of explanation, first and second surfaces 1 and 2 of the capacitor body 110 refer to opposite surfaces of the capacitor body 110 opposing each other in the Z direction, third and fourth surfaces 3 and 4 of the capacitor body 110 refer to opposite surfaces of the capacitor body 110 connected to the first and second surfaces 1 and 2 and opposing each other in the X direction, and fifth and sixth surfaces 5 and 6 of the capacitor body 110 refer to opposite surfaces of the capacitor body 110 connected to the first and second surfaces 1 and 2, connected to the third and fourth surfaces 3 and 4, and opposing each other in the Y direction. In the present exemplary embodiment, the first surface 1 of the capacitor body 110 may be the mounting surface.

The dielectric layer 111 may include a ceramic material having a high dielectric constant, for example, barium titanate ($BaTiO_3$) based ceramic powder particles, or the like, but is not limited thereto.

In addition, the dielectric layer 111 may further include a ceramic additive, an organic solvent, a plasticizer, a binder, a dispersant, and the like, in addition to the ceramic powder particles.

As the ceramic additive, for example, a transition metal oxide or a transition metal carbide, a rare earth element, such as magnesium (Mg), aluminum (Al), or the like, may be used.

Figure 3A:
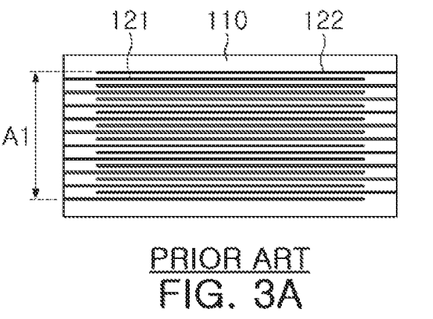
FIGS. 3A through 3D are cross-sectional views illustrating capacitor bodies of a multilayer capacitor according to the related art and multilayer capacitors according to three exemplary embodiments, respectively.
Figure 3B:
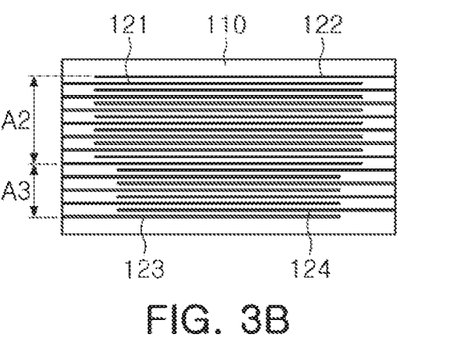

In addition, the active region may include a first active region A2 positioned in an upper portion of the capacitor body 110 in the Z direction and a second active region A3 positioned in a lower portion of the capacitor body 110 in the Z direction.

The first active region A2 may be adjacent to the second surface 2 of the capacitor body 110 and separated from the second surface 2 by the cover region 112, where the second surface 2 is an opposite surface to the mounting surface. The first active region A2 may include a plurality of first and second internal electrodes 121 and 122 alternately stacked therein.

The first and second internal electrodes 121 and 122, which are electrodes having different polarities, may be alternately disposed in the Z direction with each of the dielectric layers 111 interposed therebetween. One end of each of the first internal electrodes 121 may be exposed through the third surface 3 and one end of each of the second internal electrodes 122 may be exposed through the fourth surface 4 of the capacitor body 110, to be electrically connected to the first and second external electrodes 131 and 132, respectively.

The second active region A3 may be adjacent to the first surface 1 of the capacitor body 110 and separated from the first surface 1 by the cover region 113, where the first surface 1 corresponds to the mounting surface, and may include a plurality of third and fourth internal electrodes 123 and 124.

The third and fourth internal electrodes 123 and 124, which are electrodes having different polarities, may be alternately disposed in the Z direction with each of the dielectric layers 111 interposed therebetween. One end of each of the third internal electrodes 123 may be exposed through the third surface 3 and one end of each of the fourth internal electrodes 124 may be exposed through the fourth surface 4 of the capacitor body 110, to be electrically connected to the first and second external electrodes 131 and 132, respectively.

Figure 4A:
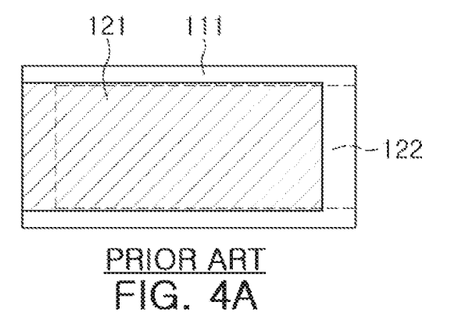
FIGS. 4A through 4D are plan views illustrating areas of overlap between internal electrodes in the multilayer capacitors shown respectively in FIGS. 3A through 3D.
Figure 4B:
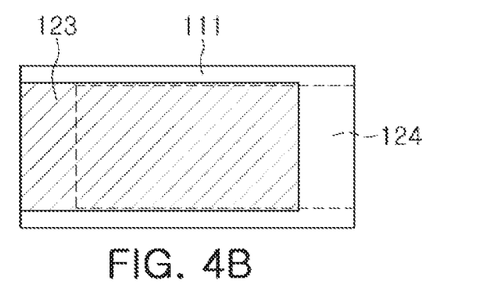

In addition, an area of overlap between the third and fourth internal electrodes 123 and 124 in the second active region A3 may be smaller than areas of overlap between the first and second internal electrodes 121 and 122 in the first active region A2.

In this case, the area of overlap between the internal electrodes in the first active region A2 and the second active region A3 may be substantially overlapping with each other in the Z stacking direction.

In the present exemplary embodiment, a deviation between the areas of overlap between pairs of adjacent first and second internal electrodes 121 and 122 in the first active region A2 may be 5% or less, and a deviation between the areas of overlap between pairs of adjacent third and fourth internal electrodes 123 and 124 in the second active region A3 may be 5% or less.

In addition, in order to make the area of overlap in the second active region A3 smaller than those in the first active region A2, the third and fourth internal electrodes 123 and 124 in the second active region A3 may be formed to have lengths smaller than those of the first and second internal electrodes 121 and 122 in the first active region A2. In this way, internal electrodes may be provided with lower density in the second active region A3 than in the first active region A2.

In this case, a deviation between the lengths of the first and second internal electrodes 121 and 122 in the first active region A2 may be 5% or less, and a deviation between the lengths of the third and fourth internal electrodes 123 and 124 in the second active region A3 may be 5% or less.

Meanwhile, each of the first and second internal electrodes 121 and 122 and the third and fourth internal electrodes 123 and 124 may be formed of a conductive metal, for example, a material such as nickel (Ni), a nickel (Ni) alloy, or the like. However, a material of each of the first and second internal electrodes 121 and 122 and the third and fourth internal electrodes 123 and 124 is not limited thereto.

According to the configuration as described above, when predetermined voltages are applied to the first and second external electrodes 131 and 132, electric charges maybe accumulated between the first and second internal electrodes 121 and 122 facing each other and between the third and fourth internal electrodes 123 and 124 facing each other.

In this case, capacitance of the multilayer capacitor 100 may be in proportion to the area of overlap between the first and second internal electrodes 121 and 122 and the area of overlap between the third and fourth internal electrodes 123 and 124 in the Z direction.

Meanwhile, the area of overlap between the third and fourth internal electrodes 123 and 124 in the second active region A3 may be 25% or more of the area of overlap between the first and second internal electrodes 121 and 122 in the first active region A2.

When a ratio of the area of overlap between the third and fourth internal electrodes 123 and 124 in the second active region A3 to the area of overlap between the first and second internal electrodes 121 and 122 in the first active region A2 is less than 25%, a thickness of the second active region may be excessively thick to provide a given total capacitance value, such that an overall thickness of the multilayer capacitor may be excessively increased.

In addition, the area of overlap between the third and fourth internal electrodes 123 and 124 in the second active region A3 may be at most 85% or less of the area of overlap between the first and second internal electrodes 121 and 122 in the first active region A2. When the ratio of the area of overlap between the third and fourth internal electrodes 123 and 124 in the second active region A3 to the area of overlap between the first and second internal electrodes 121 and 122 in the first active region A2 exceeds 85%, a board vibration displacement reduction amount may be less than 10%, such that an acoustic noise reduction effect may be slight.

In addition, a thickness of the first active region A2 in the Z direction may be 50% or more of a thickness of the entire active region (e.g., including the first and second active regions A2 and A3).

When a ratio of the thickness of the first active region A2 in the Z direction to the thickness of the entire active region (e.g., including the first and second active regions A2 and A3) is less than 50%, the thickness of the second active region A3 needs to be increased in order to secure the same level of capacitance, and the overall thickness of the multilayer capacitor may thus be excessively increased.

The first and second external electrodes 131 and 132 may be formed, respectively, on the third and fourth surfaces 3 and 4 of the capacitor body 110 in the X direction, and voltages having different polarities may be provided to the first and second external electrodes 131 and 132, respectively. In addition, the first and second external electrodes 131 and 132 may be electrically connected to the exposed portions of the first and second internal electrodes 121 and 122, respectively, and the exposed portions of the third and fourth internal electrodes 123 and 124, respectively.

Plating layers may be formed on surfaces of the first and second external electrodes 131 and 132 in some examples.

For example, the first and second external electrodes 131 and 132 may include first and second conductive layers, first and second nickel (Ni) plating layers formed on the first and second conductive layers, and first and second tin (Sn) plating layers formed on the first and second nickel plating layers, respectively.

In addition, the first external electrode 131 may include a first connected portion 131a and a first band portion 131b.

The first connected portion 131a may be disposed on the third surface 3 of the capacitor body 110 and may be electrically connected to the first and third internal electrodes 121 and 123, and the first band portion 131b may extend from the first connected portion 131a to a portion of the first surface 1 of the capacitor body 110.

In this case, the first band portion 131b may further extend to a portion of the second surface 2 of the capacitor body 110 and portions of the fifth and sixth surfaces 5 and 6 of the capacitor body 110, if desired, in order to improve adhesive strength, or the like.

The second external electrode 132 may include a second connected portion 132*a* and a second band portion 132*b*.

The second connected portion 132*a* may be disposed on the fourth surface 4 of the capacitor body 110 and be electrically connected to the second and fourth internal electrodes 122 and 124, and the second band portion 132*b* may extend from the second connected portion 132*a* to a portion of the first surface 1 of the capacitor body 110.

In this case, the second band portion 132*b* may further extend to a portion of the second surface 2 of the capacitor body 110 and portions of the fifth and sixth surfaces 5 and 6 of the capacitor body 110, if desired, in order to improve adhesive strength, or the like.

Structures of internal electrodes and a difference in a displacement distribution depending on the structures of the internal electrodes in Comparative Example and Inventive Examples 1 to 3 will hereinafter be described with reference to FIGS. 3A through 3D, 4A through 4D, and 5A through 5H.

In this case, an audio frequency may be set from 2 kHz to 9 kHz. In addition, for convenience of explanation, Comparative Example and Inventive Examples 1 to 3 are illustrated in the drawings in a state in which the number of stacked internal electrodes is reduced.

Here, FIGS. 3A, 4A, 5A, and 5E are views illustrating Comparative Examples in which an active region A1 is not divided into two active regions and first and second internal electrodes 121 and 122 are formed on a total of two hundred layers. FIGS. 3B, 4B, 5B, and 5F are views illustrating Inventive Example 1. FIGS. 3C, 4C, 5C, and 5G are views illustrating Inventive Example 2. FIGS. 3D, 4D, 5D, and 5H are views illustrating Inventive Example 3.

In Inventive Example 1, a capacitor body 110 may include a total of two hundred and ten internal electrodes, first and second internal electrodes 121 and 122 of a first active region A2 may be formed on one hundred and forty layers, and third and fourth internal electrodes 123 and 124 of a second active region A3 may be formed on seventy layers.

In this case, the area of overlap between the third and fourth internal electrodes 123 and 124 in the second active region A3 may be 85% of the area of overlap between the first and second internal electrodes 121 and 122 in the first active region A2.

Figure 3C:
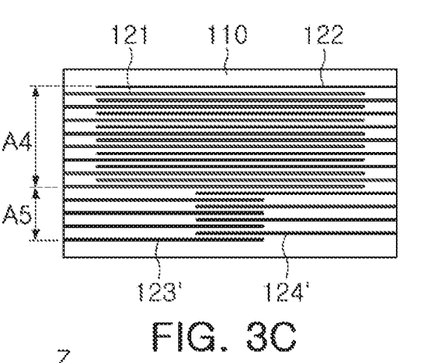
Figure 4C:
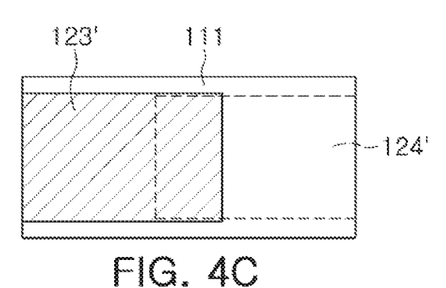

In Inventive Example 2, a capacitor body 110 may include a total of two hundred and sixty internal electrodes, first and second internal electrodes 121 and 122 of a first active region A4 may be formed on one hundred and eighty layers, and third and fourth internal electrodes 123' and 124' of a second active region A5 may be formed on eighty layers.

In this case, the area of overlap between the third and fourth internal electrodes 123' and 124' in the second active region A5 may be 25% of the area of overlap between the first and second internal electrodes 121 and 122 in the first active region A4.

Figure 3D:
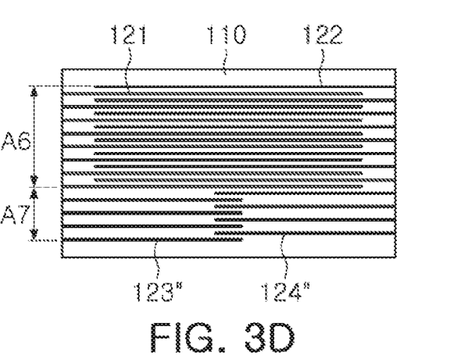
Figure 4D:
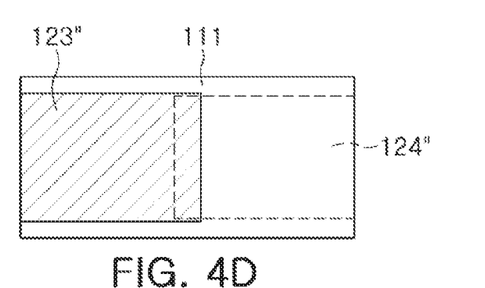
Figure 5A:
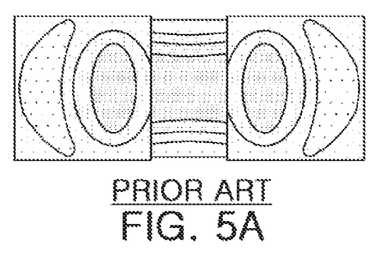
FIGS. 5A through 5D are views illustrating a displacement distribution of pads disposed on an upper surface of a board when the multilayer capacitors of FIGS. 3A through 3D, respectively, are mounted on the board.
Figure 5B:
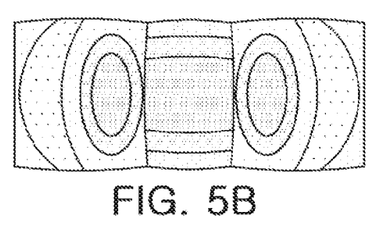
Figure 5C:
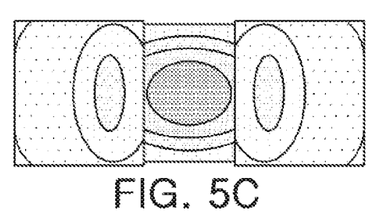
Figure 5D:
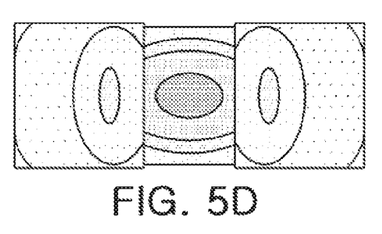
Figure 5E:
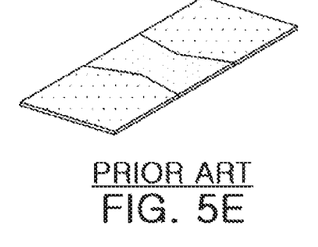
FIGS. 5E through 5H are views illustrating a disposition distribution of the board when the multilayer capacitors of FIGS. 3A through 3D, respectively, are mounted on the board.
Figure 5F:
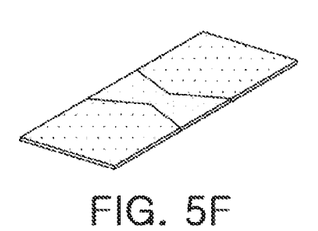
Figure 5G:
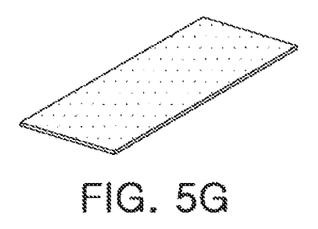
Figure 5H:
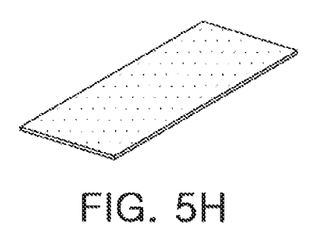

In Inventive Example 3, a capacitor body 110 may include a total of two hundred and ninety internal electrodes, first and second internal electrodes 121 and 122 of a first active region A6 may be formed on one hundred and ninety layers, and third and fourth internal electrodes 123" and 124" of a second active region A7 may be formed on one hundred layers.

In this case, the area of overlap between the third and fourth internal electrodes 123" and 124" in the second active region A7 may be 10% of the area of overlap between the first and second internal electrodes 121 and 122 in the first active region A6.

Figure 7:
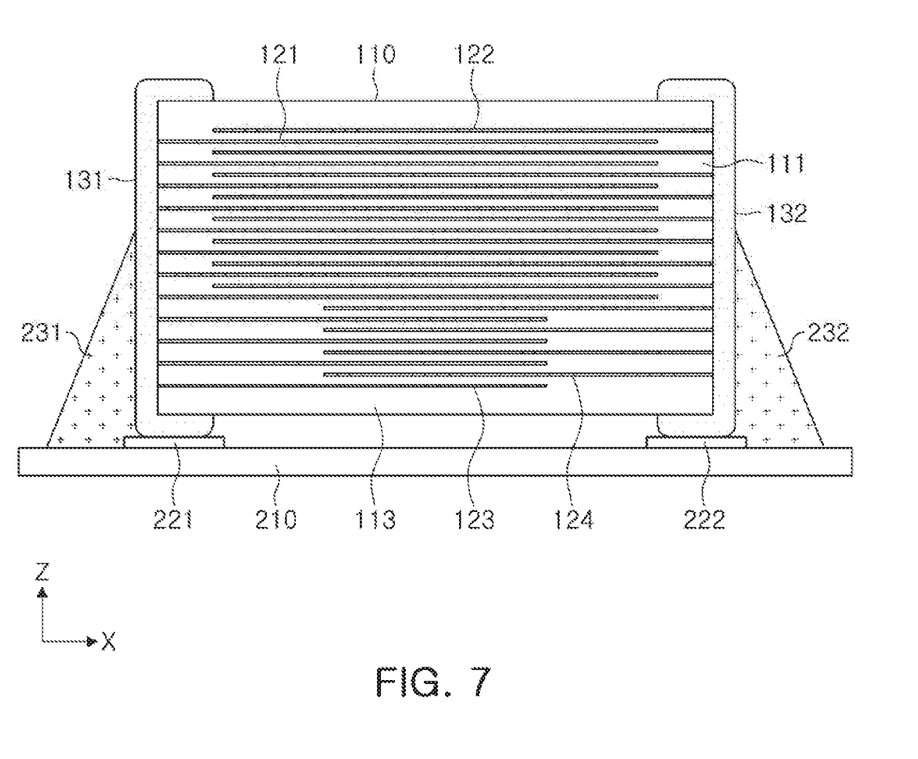
FIG. 7 is a cross-sectional view illustrating the multilayer capacitor of FIG. 1 mounted on a board.
Figure 8:
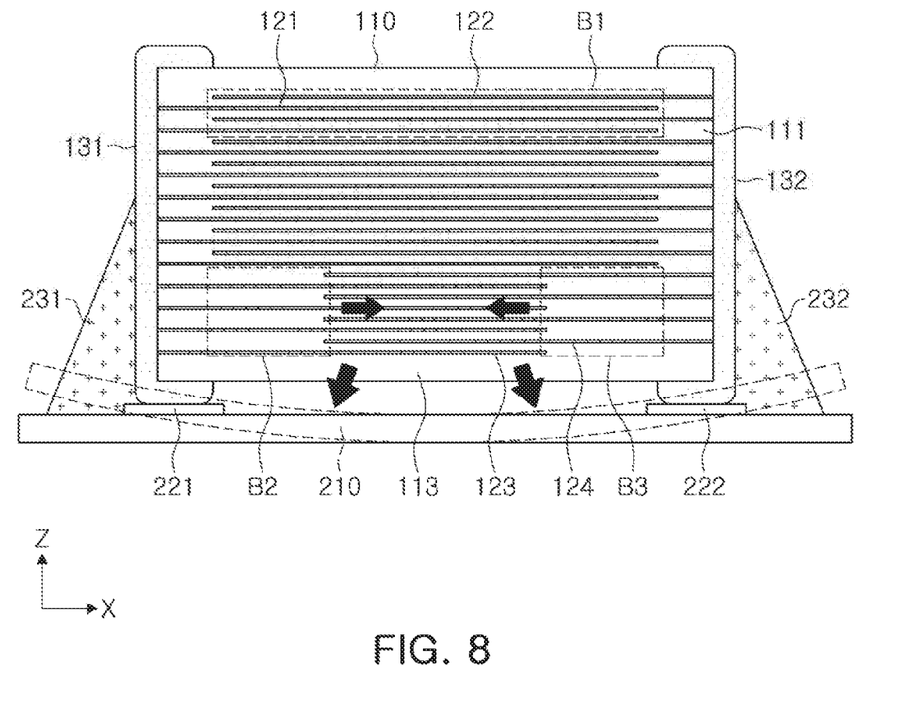
FIG. 8 is a cross-sectional view illustratively showing how vibrations are transferred to the board in a case in which the multilayer capacitor of FIG. 1 is mounted on the board.

As illustrated in FIGS. 7 and 8, the multilayer capacitor 100 according to the present exemplary embodiment is a horizontal stack type capacitor, and when a voltage is applied to the multilayer capacitor 100, the capacitor body 110 may be expanded and deformed in the Z direction, and may be contracted and deformed in the X direction and the Y direction.

In more detail, when the multilayer capacitor 100 is mounted on a board 210, first and second pads 221 and 222 bonded to the first and second external electrodes 131 and 132 may be pressed downwardly due to the expansion and deformation of the capacitor body 110 in the Z direction, such that displacements may be generated in the first and second pads 221 and 222.

In addition, the contraction and deformation of the capacitor body 110 in the X direction and the Y direction may be transferred to the first and second pads 221 and 222 through solders 231 and 232, such that displacements may be generated at end portions of the first and second pads 221 and 222 to lift the board 210 upward.

Referring to FIGS. 5A through 5H and FIG. 6, in Inventive Examples 1 to 3 in which internal electrodes are configured so as not to overlap each other at upper portions of first and second pads 221 and 222 and portions adjacent to third and fourth surfaces 3 and 4 of a capacitor body 110 at a lower portion of a multilayer capacitor, piezoelectric deformation of a mounting surface and end surfaces of a lower portion of the capacitor body 110 may be reduced by reducing the area of overlap between the third and fourth internal electrodes of the second active region.

Therefore, acoustic noise may be reduced by reducing vibrations transferred from the capacitor body 110 to the board 210 as compared to the Comparative Example.

Meanwhile, since a first active region is positioned at an upper portion of the capacitor body 110, vibrations generated in the first active region may not be transferred well to the board 210.

Therefore, as illustrated in FIG. 8, capacitance reduced due to reduced area of overlap B2 and B3 between the third and fourth internal electrodes 123 and 124 in the second active region may be compensated for by increasing the number of first and second internal electrodes 121 and 122 stacked in the first active region by B1.

Meanwhile, although Inventive Example 1 in the present disclosure is illustrated and described by way of example in FIGS. 7 and 8, the present disclosure is not limited thereto, and the same effect as that of Inventive Example 1 may be generated even in Inventive Examples 2 and 3 even though numeral values are different from that of Inventive Example 1.

That is, in Inventive Examples 1, 2, and 3, the area of overlap between the third and fourth internal electrodes 123 and 124 in the second active region are smaller than the area of overlap between the first and second internal electrodes 121 and 122 in the first active region, but the same capacitance as that of the Comparative Example may be secured by increasing the number of first and second internal electrodes 121 and 122 stacked in the first active region.

In addition, the entire number of stacked internal electrodes is less in Inventive Example 1 than in Inventive Example 2, such that a height of a multilayer capacitor according to Inventive Example 1 may be relatively lower than that of a multilayer capacitor according to Inventive Example 2, but it may be appreciated that Inventive Example 1 is more advantageous in terms of a displacement distribution than Inventive Example 2.

Figure 6:
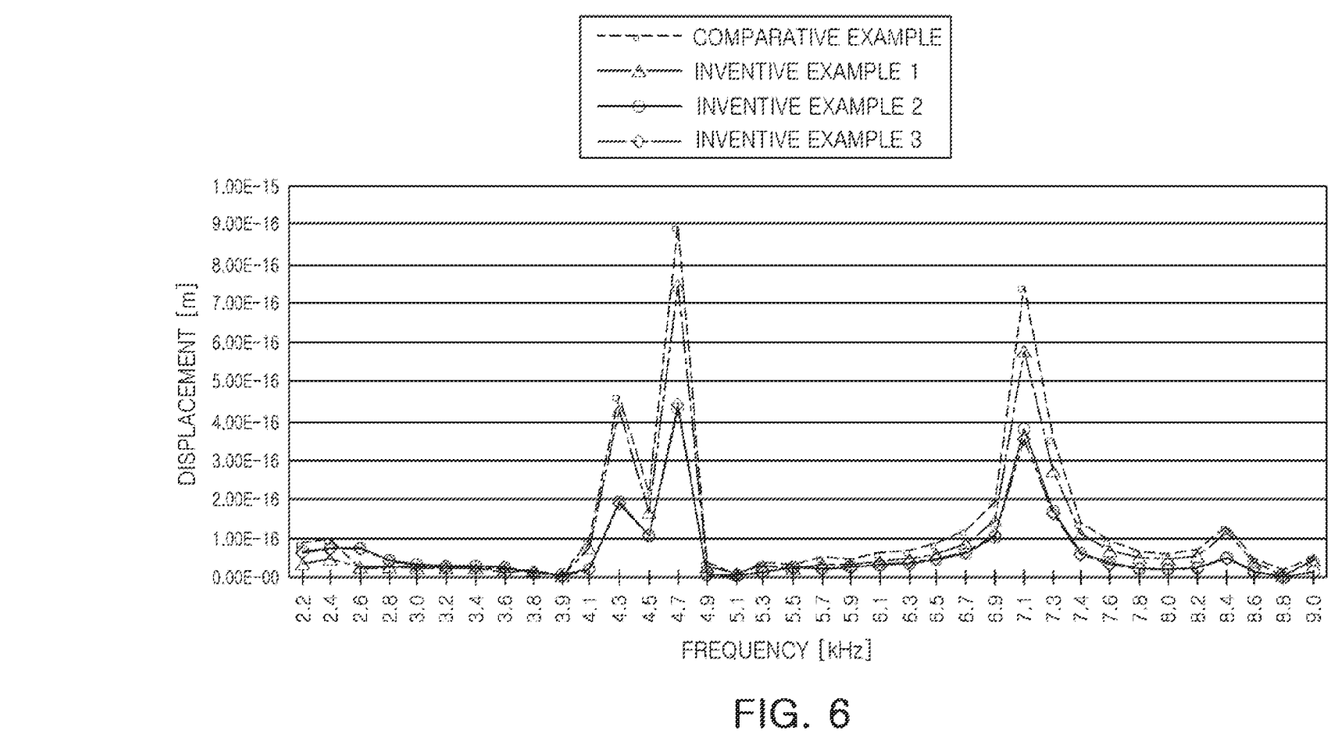
FIG. 6 is a graph illustrating displacements of the board depending on frequencies in the multilayer capacitor according to the related art and the multilayer capacitors according to three exemplary embodiments discussed in the present disclosure.

Table 1 illustrates displacements of the board at corresponding resonant frequencies of Comparative Example and Inventive Examples 1 to 3 as also shown in FIG. 6. Here, a ratio indicates reduction ratios of displacements of aboard of Inventive Examples 1 to 3 to a displacement of a board of the Comparative Example at each resonant frequency.

TABLE 1

| Resonant Frequency | Area of Overlap | Displacement [m] of Board | Ratio (%) |
|---|---|---|---|
| 4.3 kHz | Comparative Example | 4.59E−11 | — |
|  | Inventive Example 1 | 4.21E−11 | 8.3 |
|  | Inventive Example 2 | 1.94E−11 | 57.7 |
|  | Inventive Example 3 | 1.74E−11 | 62.0 |
| 4.7 kHz | Comparative Example | 8.94E−11 | — |
|  | Inventive Example 1 | 8.10E−11 | 9.4 |
|  | Inventive Example 2 | 4.28E−11 | 52.1 |
|  | Inventive Example 3 | 3.85E−11 | 56.9 |
| 7.1 kHz | Comparative Example | 7.38E−11 | — |
|  | Inventive Example 1 | 6.75E−11 | 8.5 |
|  | Inventive Example 2 | 3.71E−11 | 49.7 |
|  | Inventive Example 3 | 3.34E−11 | 54.8 |

Referring to Table 1, when the area of overlap between the third and fourth internal electrodes is 85% of the area of overlap between the first and second internal electrodes as in Inventive Example 1, a displacement reduction effect is less than 10% as compared to the Comparative Example, which is not large.

It may be appreciated that when the area of overlap between the third and fourth internal electrodes is 25% of the area of overlap between the first and second internal electrodes as in Inventive Example 2, a displacement reduction effect slightly exceeds 50% as compared to the Comparative Example, thereby providing a significant increase as compared to Inventive Example 1.

In addition, it may be appreciated that even though the area of overlap between the third and fourth internal electrodes is significantly reduced to 10% of the area of overlap between the first and second internal electrodes in Inventive Example 3, a displacement reduction effect is 62.0% as compared to the Comparative Example, thereby providing a not significant improvement as compared to Inventive Example 2.

Table 2 illustrates the total numbers of stacked internal electrodes of Inventive Examples 1 to 3 with respect to Comparative Example 1.

TABLE 2

|  | Total Number of Stacked Internal Electrodes | Increase Percentage (%) in Number of Layers |
|---|---|---|
| Comparative Example | 200 | — |
| Inventive Example 1 | 210 | 5 |
| Inventive Example 2 | 260 | 30 |
| Inventive Example 3 | 290 | 45 |

Referring to Table 2, it may be appreciated that an increase percentage in the number of layers is increased by 15% and an overall thickness of a multilayer capacitor is also increased when the area of overlap between the third and fourth internal electrodes is 10% of the area of overlap between the first and second internal electrodes as in Inventive Example 3 as compared to when the area of overlap between the third and fourth internal electrodes is 25% of the area of overlap between the first and second internal electrodes as in Inventive Example 2.

Therefore, a ratio of the area of overlap between the third and fourth internal electrodes to the area of overlap between the first and second internal electrodes in which an increase in the overall thickness of the multilayer capacitor may be suppressed as much as possible while considering a board displacement reduction effect may be 25% or more.

Therefore, referring to Tables 1 and 2, the area of overlap between the third and fourth internal electrodes in the second active area may be 25% to 85% of the area of overlap between the first and second internal electrodes in the first active region.

Figure 9:
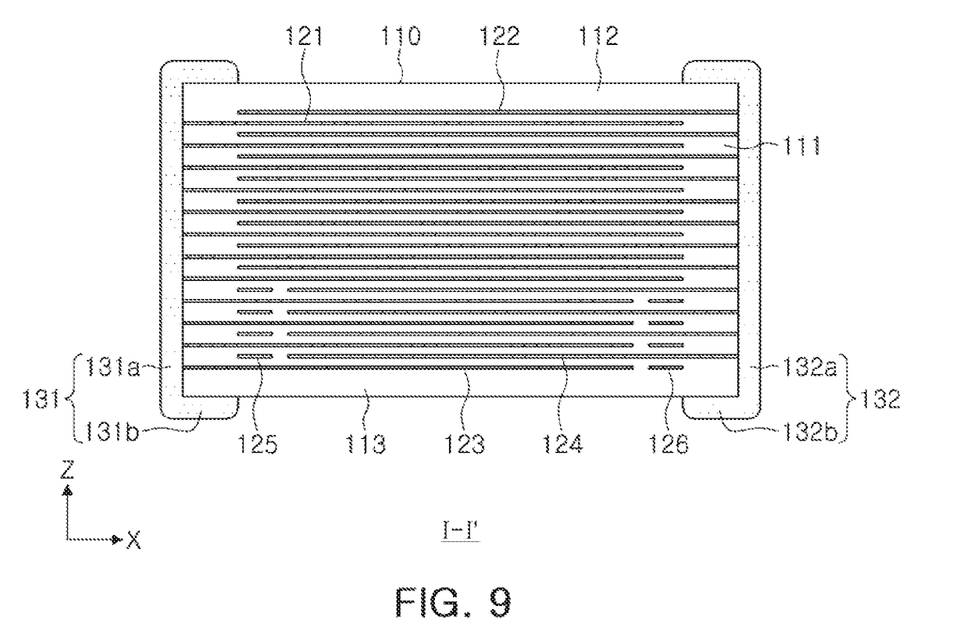
FIG. 9 is a schematic cross-sectional view illustrating a multilayer capacitor according to another exemplary embodiment.

Meanwhile, FIG. 9 is a schematic cross-sectional view illustrating a multilayer capacitor according to another exemplary embodiment in the present disclosure.

Referring to FIG. 9, the multilayer capacitor according to another exemplary embodiment in the present disclosure may include a plurality of first and second dummy electrodes 125 and 126 disposed in the second active region so as to be spaced apart from the third and fourth internal electrodes 123 and 124.

In this case, the first dummy electrodes 125 may be disposed to be spaced apart from the first external electrode 131, and may be disposed so that one ends thereof are approximately aligned with end portions of the second internal electrodes 122 along a line extending in the Z direction.

In addition, the second dummy electrodes 126 may be disposed to be spaced apart from the second external electrode 132, and may be disposed so that one ends thereof are approximately aligned with end portions of the first internal electrodes 121 along a line extending in the Z direction.

In the multilayer capacitor according to the present exemplary embodiment, densities of the first active region and the second active region are different from each other, and a lower portion of the capacitor body 110 may be deformed in a pot shape in a compression sintering process performed during manufacturing of the multilayer capacitor.

According to the present exemplary embodiment, the first and second dummy electrodes 125 and 126 may serve to correct the density of the second active region to be similar to that of the first active region to suppress the capacitor body 110 from being deformed in the compression sintering process as much as possible.

According to the structure of the multilayer capacitor according to the present exemplary embodiment as described above, a vibration amount of piezoelectric vibrations of the multilayer capacitor transferred to the board at an audio frequency within 20 kHz of the multilayer capacitor may be effectively suppressed.

Therefore, high frequency vibrations of the multilayer capacitor may be reduced to thereby prevent malfunctions of sensors that may be caused by high frequency vibrations in a high frequency region of 20 kHz or more of the multilayer capacitor in information technology (IT) or industry/electrical component fields and suppress accumulation of internal fatigue of the sensors due to vibrations for a long period of time.

As set forth above, according to the exemplary embodiments in the present disclosure, acoustic noise in an audio frequency region less than 20 kHz and the high frequency vibrations in the high frequency region of 20 kHz or more of the multilayer capacitor may be reduced.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a capacitor body including an active region including a plurality of dielectric layers and a plurality of internal electrodes stacked with each of the dielectric layers interposed therebetween, having first and second surfaces opposing each other, and having third and fourth surfaces connected to the first and second surfaces and opposing each other, wherein one end of each internal electrode of the plurality of stacked internal electrodes is exposed through an alternating one of the third and fourth surfaces; and
first and second external electrodes disposed, respectively, on the third and fourth surfaces of the capacitor body, and connected, respectively, to the internal electrodes exposed through the third and fourth surfaces of the capacitor body,
wherein the active region includes a first active region adjacent to the second surface of the capacitor body and a second active region adjacent to the first surface of the capacitor body, the first surface of the capacitor body being a mounting surface of the capacitor body,
an area of overlap between adjacent internal electrodes in the second active region is smaller than an area of overlap between adjacent internal electrodes in the first active region,
a deviation between areas of overlap between the adjacent internal electrodes in the first active region is 5% or less, and a deviation between areas of overlap between the adjacent internal electrodes in the second active region is 5% or less, and
the multilayer capacitor further includes a plurality of dummy electrodes each co-planar with a corresponding one of the internal electrodes in the second active region and spaced apart from the corresponding one of the internal electrodes and from the third and fourth surfaces, and both the dummy electrodes and the internal electrodes in the second active region overlap each of the internal electrodes in the first active region in a thickness direction.

2. The multilayer capacitor of claim 1, wherein the area of overlap between the adjacent internal electrodes in the second active region is 25% or more of the area of overlap between the adjacent internal electrodes in the first active region.

3. The multilayer capacitor of claim 1, wherein the area of overlap between the adjacent internal electrodes in the second active region is 85% or less of the area of overlap between the adjacent internal electrodes in the first active region.

4. The multilayer capacitor of claim 1, wherein a thickness of the first active region in a stacking direction of the internal electrodes is 50% or more of a thickness of the entire active region.

5. A multilayer capacitor comprising:
a capacitor body including an active region including a plurality of dielectric layers and a plurality of internal electrodes stacked with each of the dielectric layers interposed therebetween, having first and second surfaces opposing each other, and having third and fourth surfaces connected to the first and second surfaces and opposing each other, wherein one end of each internal electrode of the plurality of stacked internal electrodes is exposed through an alternating one of the third and fourth surfaces; and
first and second external electrodes disposed, respectively, on the third and fourth surfaces of the capacitor body, and connected, respectively, to the internal electrodes exposed through the third and fourth surfaces of the capacitor body,
wherein the active region includes a first active region adjacent to the second surface of the capacitor body and a second active region adjacent to the first surface of the capacitor body, the first surface of the capacitor body being a mounting surface of the capacitor body,
the internal electrodes are provided in the second active region with a lower density than the internal electrodes are provided in the first active region,
a deviation between the lengths of the internal electrodes in the first active region is 5% or less, and a deviation between the lengths of the internal electrodes in the second active region is 5% or less, and
the multilayer capacitor further includes a plurality of dummy electrodes each co-planar with a corresponding one of the internal electrodes in the second active region and spaced apart from the corresponding one of the internal electrodes and from the third and fourth surfaces, and both the dummy electrodes and the internal electrodes in the second active region overlap each of the internal electrodes in the first active region in a thickness direction.

6. The multilayer capacitor of claim 5, wherein lengths of the internal electrodes in the second active region are shorter than lengths of the internal electrodes in the first active region.

7. The multilayer capacitor of claim 5, wherein an area of overlap between adjacent internal electrodes in the second active region is 25% or more of an area of overlap between adjacent internal electrodes in the first active region.

8. The multilayer capacitor of claim 5, wherein an area of overlap between adjacent internal electrodes in the second active region is 85% or less of an area of overlap between adjacent internal electrodes in the first active region.

9. A multilayer capacitor comprising:
a capacitor body including pluralities of first and second internal electrodes alternately stacked with dielectric layers therebetween, and pluralities of third and fourth internal electrodes alternately stacked with dielectric layers therebetween; and
first and second external electrodes disposed on first and second side surfaces of the capacitor body opposite each other in a length direction,
wherein one end of each first and third internal electrode is exposed to the first side surface having the first external electrode, and one end of each second and fourth internal electrode is exposed to the second side surface having the second external electrode, and
an area of overlap between adjacent third and fourth internal electrodes is 85% or less of the area of overlap between adjacent first and second internal electrodes, and
the multilayer capacitor further includes a plurality of first dummy electrodes each co-planar with a corresponding one of the plurality of third internal electrodes and spaced apart from the corresponding one of the third internal electrodes and from the second side surface, and both the first dummy electrodes and the third internal electrodes overlap the second internal electrodes in a thickness direction.

10. The multilayer capacitor of claim 9, wherein the area of overlap between the adjacent third and fourth internal electrodes is 25% or more of an area of overlap between adjacent first and second internal electrodes.

11. The multilayer capacitor of claim 9, wherein deviations in widths between all of the first, second, third, and fourth internal electrodes in a width direction orthogonal to the length direction are 5% or less, and deviations in lengths between all of the first and second internal electrodes in the length direction are 5% or less, and deviations in lengths between all of the third and fourth internal electrodes in the length direction are 5% or less.

12. The multilayer capacitor of claim 9, wherein the capacitor body includes a mounting surface adjacent to the first and second side surfaces, parallel to the first, second, third, and fourth internal electrodes, and having the first and second external electrodes extending thereon, and the adjacent third and fourth internal electrodes, having the area of overlap 85% or less of the area of overlap between the adjacent first and second internal electrodes, are disposed between the mounting surface and the first and second internal electrodes.

13. The multilayer capacitor of claim 9, wherein only second internal electrodes from among the second, third, and fourth internal electrodes are disposed between the first internal electrodes, and only third internal electrodes from among the first, second, and third internal electrodes are disposed between the fourth internal electrodes.

14. The multilayer capacitor of claim 9, wherein the first, second, third, and fourth internal electrodes are stacked in the thickness direction, and a thickness of a first active region in which only the first and second internal electrodes are stacked, from among the first, second, third, and fourth internal electrodes, is 50% or more of a thickness of an entire active region in which any of the first, second, third, and fourth internal electrodes are stacked.

15. The multilayer capacitor of claim 9, further comprising:

a plurality of second dummy electrodes each co-planar with a corresponding one of the plurality of fourth internal electrodes and spaced apart from the corresponding one of the fourth internal electrodes and from the first side surface, and both the second dummy electrodes and the fourth internal electrodes overlap the first and second internal electrodes in the thickness direction.

16. The multilayer capacitor of claim 15, wherein each first dummy electrode is spaced apart from the second side surface by a distance equal to a spacing between each first internal electrode and the second side surface, and each second dummy electrode is spaced apart from the first side surface by a distance equal to a spacing between each second internal electrode and the first side surface.

17. The multilayer capacitor of claim 15, wherein each first dummy electrode is spaced apart from the second side surface by a distance equal to a distance by which the second external electrode extends from the second side surface onto a mounting surface of the capacitor body, and each second dummy electrode is spaced apart from the first side surface by a distance equal to a distance by which the first external electrode extends from the first side surface onto the mounting surface of the capacitor body.

18. An assembly comprising:

a board having first and second pads on a surface thereof; and the multilayer capacitor of claim 9 bonded to the first and second pads such that the first and second external electrodes are respectively bonded to the first and second pads.

19. The assembly of claim 18, wherein the adjacent third and fourth internal electrodes, having the area of overlap 85% or less of the area of overlap between the adjacent first and second internal electrodes, are disposed between the first and second pads and the first and second internal electrodes.

* * * * *